G. W. SCHREURS.
SPUN.
APPLICATION FILED AUG. 7, 1915.
1,233,613.
Patented July 17, 1917.
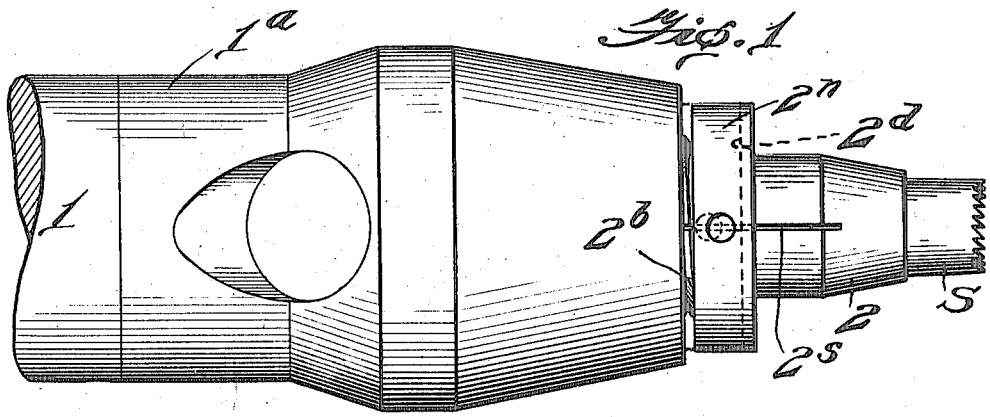
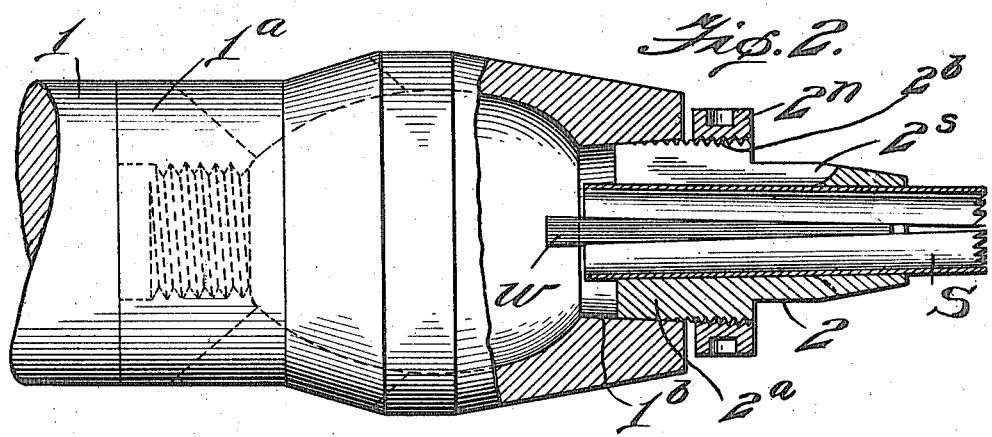
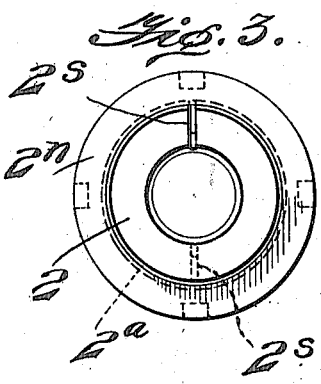
Witnesses
Inventor
Garrett W. Schreurs
By Dwell & Dwell
Attorneys

UNITED STATES PATENT OFFICE.

GARRETT W. SCHREURS, OF MUSCATINE, IOWA.

SPUN.

1,233,613.  Specification of Letters Patent.  Patented July 17, 1917.

Application filed August 7, 1915. Serial No. 44,305.

*To all whom it may concern:*

Be it known that I, GARRETT W. SCHREURS, a citizen of the United States, residing at Muscatine, in the county of Muscatine and State of Iowa, have invented certain new and useful Improvements in Spuns; and I hereby declare that the following is a full, clear, and exact description thereof, reference being had to the accompanying drawings, which form part of this specification.

This invention is a novel improvement in button blank cutting machines and has particular reference to so-called "spuns" or spools by which the tubular saws are held in the "chucks" of such machines.

The saws employed in such machines are usually made of sheet metal bent into tubular form; such a saw is placed in a "spun" having an interior bore approximately corresponding to the exterior diameter of the saw, and having an exteriorly tapered end portion adapted to fit in a correspondingly interiorly tapered socket in the end of the "chuck," or barrel, on the end of the rotary shaft by which the saw is driven. The saw is usually clamped in the spun by means of a tapered wedge driven into the slot in the saw and expanding the latter tightly within the spun.

Customarily after a saw is wedged into a spun the tapered end of the spun is inserted into the tapered socket in the chuck and driven tightly therein by a mallet or hammer, to secure the spun to the chuck. This operation takes considerable time of the cutter in driving the spun into the chuck, and the hammering is injurious to the bearings of the shaft of the machine, and frequently mars the chuck and renders it or the spun eccentric, necessitating loosening and readjusting of the spun in the chuck to make the saw cut accurately. Considerable force or hammering is also required to extract such spuns from the chuck if it becomes necessary to change or adjust the saw and such spuns frequently consume considerable time on the part of the operator in endeavoring to true the saw.

The object of my invention is to make a practically self-adjusting, or self-centering, spun and to do away with any necessity for hammering or driving the spun into place, when the saw is therein. I accomplish this by a very simple but novel improvement in the spun, consisting in splitting the tapered end or shank of the spun longitudinally by making one or more longitudinal slots therein, the number of the slots depending upon the diameter of the spun. By simply inserting the split shank of such a spun in the end of the chuck and starting the saw shaft and bringing the saw up against a shell or other object the saw will first true itself accurately and then the spun will seat itself firmly in the chuck and become securely locked in position without any hammering and with practically no labor or loss of time.

The slots in the shank of the spun impart a limited degree of resiliency to the shank and enable it to adjust itself perfectly true while in motion, and the split shank when forced home binds itself by expansion in the socket of the chuck sufficiently to retain it securely in place. This split shank spun also insures the tight clamping of the saw when the spun is inserted in the chuck.

I preferably externally thread the shank of the spun and provide it with a threaded collar or nut which serves as a means to prevent abnormal expansion of the spun when removed from the chuck and while inserting and wedging a saw in the spun; and also serves to facilitate detaching the spun from the chuck, as by turning this collar or nut toward and against the end of the chuck its threads will force the spun out of the chuck socket without any hammering, no matter how tightly it may have been forced therein, and also this nut or collar can be adjusted against the end of the chuck after the spun is properly seated therein so as to insure that the spun remains in true position while the blanks are being cut.

I will explain the invention with reference to the acompanying drawings which illustrate practical spuns embodying the invention, and summarize in the claims the novel features and parts for which protection is desired.

In the drawings:

Figure 1 is a view of the chuck end of a button cutting machine showing one of my novel spuns attached thereto;

Fig. 2 is a longitudinal sectional view through Fig. 1;

Fig. 3 is a detail end view of the spun shown in Figs. 1 and 2 detached.

In the drawings 1ᵃ designates the chuck of an ordinary button cutting machine, such chuck may be secured to the shaft 1 in the usual manner, or may be formed integral with the shaft. This chuck is provided in its outer end with a tapered socket 1$^b$ into which the tapered shank of a saw holding spun 2 is inserted in the usual manner.

The spun 2 is in general similar in external appearance and form to the ordinary spuns commonly used; and has an axial bore to receive the saws, and has a tapered shank portion 2$^a$ adapted to be engaged with the tapered socket in the chuck, and also has a flange or collar portion 2$^n$ larger in diameter than the tapered shank.

Referring to Figs. 1 to 3, the tapered shank 2$^a$ of the spun is split by providing it with one or more longitudinal slots 2$^s$, which slots are cut after the spun is formed and are intended to enable the shank of the spun to bind itself by expansion in the tapered socket in the chuck when the spun shank is forced therein.

As above stated when the spun shank is inserted in the chuck socket, the shank, owing to its limited resiliency due to the splits or slots, will tend to automatically bind in the chuck by expansion. In Figs. 1 to 3 the shank 2$^a$ is shown as threaded at 2$^b$, and the flange 2$^n$ is formed by an annular collar nut screwed on the threaded portion, and occupying the position of the flange of an ordinary spun. After the spun shank is inserted in the chuck socket the collar nut 2$^n$ can be turned down against the end of the chuck, as indicated by the dotted lines 2$^d$ in Fig. 1, to prevent displacement of the spun during the cutting operations; and when it is desired to remove the spun by forcibly screwing collar nut 2$^n$ up against the end of the chuck the spun shank will be forced out of the socket.

A tubular saw S of ordinary construction can be inserted in the bore of the spun and secured by means of a driven wedge $w$ in the usual manner. See Fig. 2.

In my invention after a saw is fixed in the spun it is only necessary to insert the tapered shank of the spun in the chuck socket, then revolve the chuck and hold a shell or other object against the saw to press the spun against the chuck; and if the saw is not perfectly true it will true itself while cutting the blank. The slots in the shank render the same sufficiently self-adjusting to enable it to place itself perfectly true while in motion and to clamp itself by expansion in the chuck sufficiently to hold it securely in position during the cutting operation.

The essential feature of the present invention is having the spun shank slotted to enable it to hold itself in the socket by its expansive pressure or resistance; and the greater the pressure applied against the saw the tighter will the spun bind itself in the chuck without any tendency to rock or loosen up.

The invention while primarily intended to be used with spuns for button cutting machines may be adapted and used to readily and securely clamp a tool in a socket.

It is highly essential in button cutting that the saw be perfectly true, and my novel spun only has to be inserted in the chuck by hand and when pressure is exerted against the end of the saw or spun the spun proceeds to true itself while the saw is cutting so that no time is lost in truing up the spun or saw as formerly, and the necessity for hammering the spun into the chuck is obviated. Such hammering frequently causes the ordinary spuns to get out of true alinement and then they have to be loosened up and readjusted; whereas my expansive split shank spuns are practically self-centering.

What I claim is:

A spun for button cutting machines having a shank adapted to engage a chuck socket, said shank being longitudinally slotted to permit the spun to adjust itself in the socket and hold itself therein by expansion, and an adjustable collar-nut threaded upon the spun whereby the spun can be forced from its seat in a chuck socket, substantially as described.

In testimony that I claim the foregoing as my own, I affix my signature in presence of two witnesses.

GARRETT W. SCHREURS.

Witnesses:
P. J. RYAN,
A. G. TYLER.